United States Patent [19]

Creighton

[11] Patent Number: 5,333,896
[45] Date of Patent: Aug. 2, 1994

[54] BIRD CAGE TYPE SUSPENSION WITH BEARING CONNECTED TO AXLE TUBE

[76] Inventor: Brad M. Creighton, 60 York Rd., Warminster, Pa. 18974

[21] Appl. No.: 49,289

[22] Filed: Apr. 20, 1993

[51] Int. Cl.⁵ .............................................. B60G 9/02
[52] U.S. Cl. .................... 280/688; 180/349; 180/905; 280/105
[58] Field of Search ............ 180/348, 349, 380, 905; 280/673, 674, 688, 105

[56] References Cited

U.S. PATENT DOCUMENTS

| | | | |
|---|---|---|---|
| 4,334,696 | 6/1982 | Bergstrom | 280/725 |
| 4,354,567 | 10/1982 | Puchas | 180/348 |
| 4,425,976 | 1/1984 | Kimura | 180/56 |
| 4,641,854 | 2/1987 | Masuda et al. | 280/701 |
| 5,037,126 | 8/1991 | Gottschalk et al. | 280/688 |
| 5,199,526 | 4/1993 | Derviller | 180/297 |

FOREIGN PATENT DOCUMENTS

| | | | |
|---|---|---|---|
| 1577657 | 8/1969 | France | 180/348 |
| 898808 | 6/1962 | United Kingdom | 180/349 |

*Primary Examiner*—Kenneth R. Rice
*Attorney, Agent, or Firm*—Dickstein, Shapiro & Morin

[57] ABSTRACT

A bird cage having a roller bearing imposed between the axle casing and the bird cage frame. The roller bearing may be sealed to effectively alleviate the problem of dirt accommodation interfering with the rotational action of the axle casing with respect to the bird cage frame. The inside of the roller bearing may be attached to the outer surface of the axle tube or casing to alleviate side play, a sliding motion of the bird cage with respect to the axle casing. This provides a more predictable and freer suspension. The bird cage design may be modular to allow the adaptation of the bird cage to different suspension configurations and to allow for the replacement of damaged parts.

20 Claims, 8 Drawing Sheets

BIRD CAGE TYPE SUSPENSION WITH BEARING CONNECTED TO AXLE TUBE

BACKGROUND

The present invention relates to motor vehicle suspensions in general and more particularly to a bird cage design for mounting wheel axles.

In automotive suspensions, the axles and wheels are connected to the car frame in a way that allows them to move relative to the frame. In some types of racing car suspensions, a device called a "bird cage" is used in making that connection. The bird cage is a frame through which the axle extends. The suspension members and the shock absorber are mounted between the frame of the bird cage and the chassis or frame of the car. The bird cage is adapted to rotate around the axle. This yields certain advantages to the suspension design.

Typically, for a live drive axle design, the drive axle extends from a differential gear through a tube called the axle casing or axle tube. The axle extends out of the casing to be connected to the wheel. The frame of the bird cage telescopes over the axle casing. During use, the axle casing's outer surface rotates and slides against the inner surface of the bird cage. In known designs, a layer of grease provides lubrication between the inside of the bird cage and the outside of the axle casing. One disadvantage in this arrangement is the wear on the axle casing and bird cage due to the rubbing of these parts against each other. The wear is made worse under race conditions by the collection of dirt in the area of the bird cage. This wear can result in grooves and other damage to the axle casing. Wear and contamination can also result in binding of the bird cage against the axle tube which can in turn cause failure of the suspension.

SUMMARY

The present invention alleviates to a great extent the disadvantages of the prior art by providing a bird cage having a roller bearing positioned between the axle casing and the bird cage frame. The roller bearing may be sealed to effectively alleviate the problem of dirt accumulation interfering with the rotational action of the axle casing with respect to the bird cage frame.

In another aspect, the inside of the roller bearing is attached to the outer surface of the axle tube or casing to alleviate side play, a sliding motion of the bird cage with respect to the axle casing. This provides a more predictable and freer suspension.

In another aspect of the invention, the bird cage design is modular to allow the adaptation of the bird cage to different suspension configurations and to allow for the replacement of damaged parts.

It is an object of the present invention to provide a bird cage design for a motor vehicle suspension.

It is another object of the present invention to provide a bird cage which has a sealed bearing surface between the bird cage and the axle casing.

It is yet another object of the present invention to provide a bird cage that is modular in design and may be adapted to a variety of suspension types.

It is a further object of the present invention to provide a bird cage that is configured to swing arm and z-link cars.

It is yet a further object of the present invention to provide a bird cage that is configured to four link cars with single mounting points with either front or rear mounted shocks.

It is still another object of the present invention to provide a bird cage that is configured to four link cars with dual mounting points with either front or rear mounted shocks.

With these and other objects, advantages and features of the invention that may become apparent, the nature of the invention may be more clearly understood by reference to the following detailed description of the invention, the appended claims and the several drawings attached hereto.

DESCRIPTION OF PREFERRED EMBODIMENTS

Figure 1:
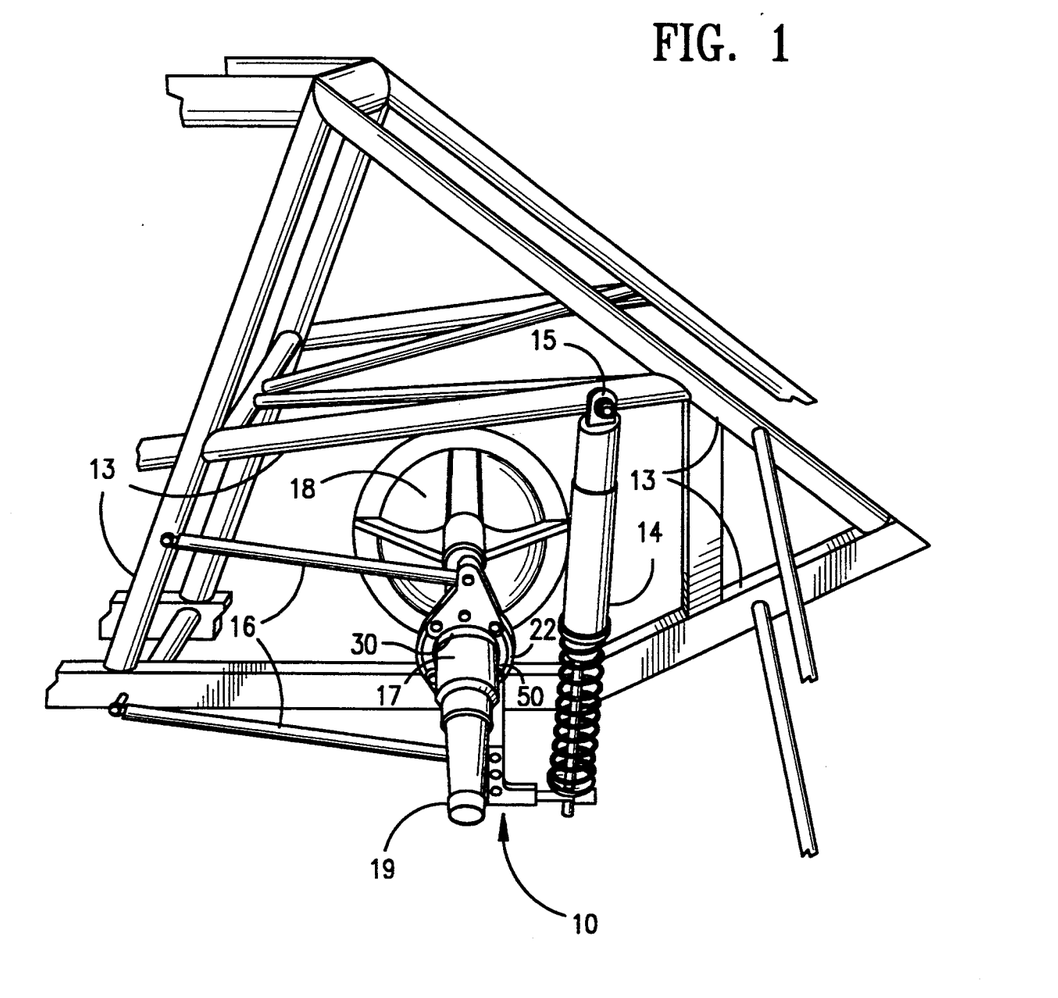
FIG. 1 is perspective view of a bird cage constructed according to a preferred embodiment of the present invention in place in an automobile suspension.

Refer now to FIG. 1 there being shown a bird cage, generally designated by reference numeral 10, according to a preferred embodiment of the present invention. The bird cage 10 is shown mounted in a race car frame 13. The bird cage 10 is adapted particularly for use in four link cars with dual mounting points. As shown in FIG. 1 the end of the axle 19 is extending out from the axle casing 17. The casing 17 extends to and is attached to the differential gear housing 18. The axle 19 is driven by the differential gears within housing 18 to rotate about its longitudinal axis 93. The road wheel that would be attached to and driven by axle 19 is not shown for clarity of the drawing. A shock absorber 14 is mounted between the bird cage 10 and the car frame 13 at mounting location 15. In addition, each link or swing-arm 16 is mounted at one end to the bird cage 10 and at the other end to the car frame 13. A swingarm usually refers to a linkage member to which a shock absorber is mounted. Usually a suspension has only one shock absorber per wheel. But some suspension arrangements use more than one shock absorber per wheel.

The axle casing 17 moves generally up and down with respect to the car frame 13. The path of movement of the casing 17 is defined by the pivoting of the links or swingarms 16. As will be explained in further detail below, the bird cage 10 does not move axially along the length of casing 17, i.e. along axis 93 towards or away from the differential housing 18. But, rather, the bird cage 10 is affixed in axial position on the axle casing 17. This fixed arrangement provides some support to help hold the axle 19 and the differential housing 18 in the desired spacial relationship to the car chassis or frame 13.

Figure 2:
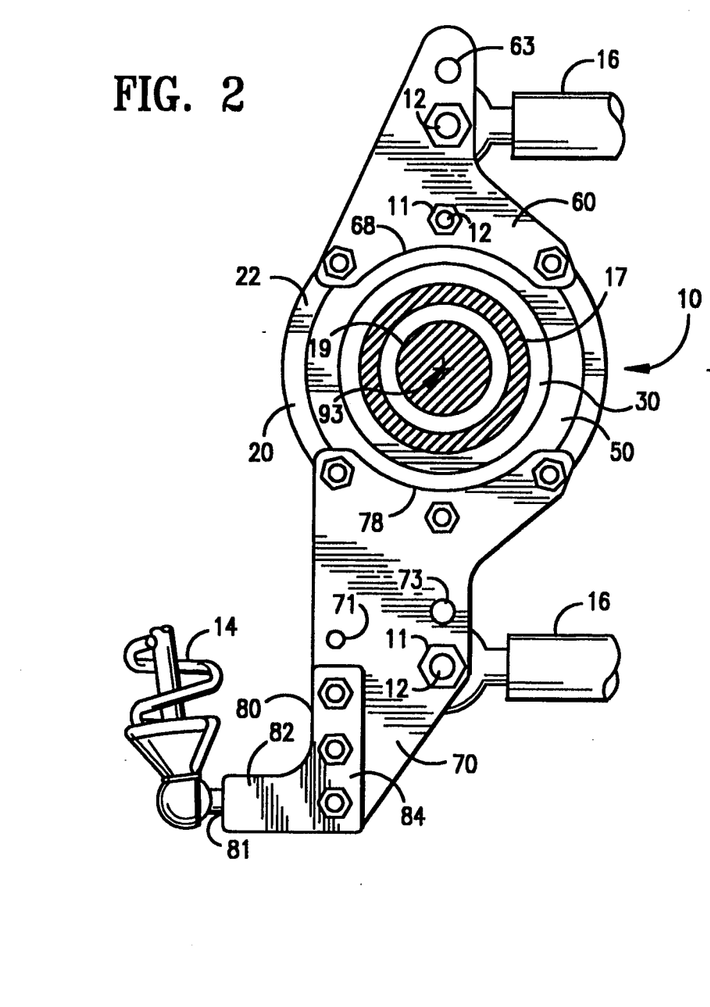
FIG. 2 is an elevational side view of the bird cage of FIG. 1.
Figure 3:
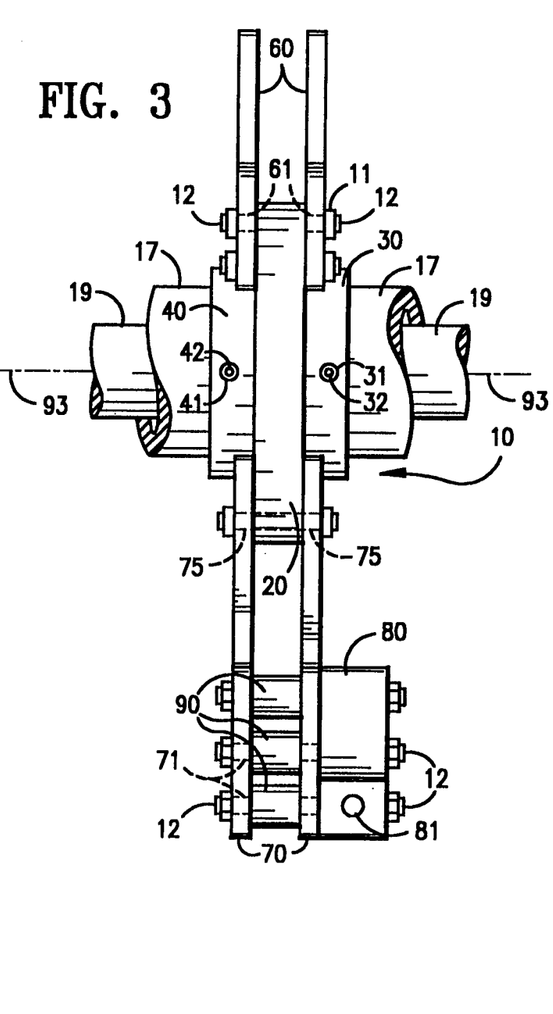
FIG. 3 is an elevational rear view of the bird cage of FIG. 2.

Refer now to FIGS. 2 and 3 which show in more detail the construction of bird cage 10. The bearing sleeve 30 and the bearing stop 40 are each provided with three threaded holes 31 and 41 respectively. Threaded screws 32 and 42 extend through the holes 31 and 41 for contacting the casing 17. By tightening the screws 32 and 42 the bearing sleeve 30 and the bearing stop 40 are fixed to the outside of the axle casing 17. The holes 31 and 41 are positioned to be accessable when plates 60 and 70 are bolted in place.

Sealed roller bearing assembly 50 rides on the bearing sleeve 30. A suitable type of roller bearing assembly would be a NSK model number 6017-2RS or comparable, available from Peer distributors of Wheeling, Ill. The bearing stop 40 holds the bearing 50 in position on the sleeve 30. A bearing carrier 20 rides on the outside of the roller bearing assembly 50. Accordingly, the roller bearing carrier 20 is mounted for rotation about the axis 93 and axle casing 17 on the roller bearing assembly 50.

Each of the mounting plates 60 and 70 are bolted in three places by bolts 12 and nuts 11 to the outer portion 22 of the bearing carrier 20. For example, a bolt 12 extends through one plate 60, through a hole 29 of the carrier 20 and through the other plate 60 to be secured by a nut 11. The portions 68 and 78 of plates 60 and 70 respectively extend inside of the inner diameter surface 23 of the outer portion 22 of the carrier 20 and inside of the outer diameter of roller bearing assembly 50 to hold the roller bearing assembly 50 in place within the carrier 20. The construction of the sleeve 30, the stop 40 and the carrier 20 is explained in further detail below with reference to FIGS. 4-9.

The swingarms or links 16 are also mounted by bolts between the two plates 60 and between the two plates 70 for pivoting with respect to the bird cage. The links 16 may be provided with a rod end bearing or other bearing construction for pivoting about the bolt 12.

The shock absorber 14 is mounted to the rear position shock mount 80. Shock absorber 14 includes a threaded connection into threaded hole 81 of the neck 82 of mount 80. The base 84 of mount 80 has three holes through each of which a bolt 12 extends. The bolts 12 extend through the base 84 and through plates 70. Spacers 90 are positioned between the plates 70 to keep them spaced approximately parallel to one another and to provide strength to the bird cage 10 once the nuts 11 and bolts 12 are tightened. The plates 70 have four mounting holes 71. Three of the mounting holes 71 are shown utilized to mount the shock mount 84. The fourth hole 71 may be used for other mounting configurations.

Each of the plates 70 has two link holes 73. One of these holes 73 is shown used for mounting swingarm or link 16. The other hole 73 may be utilized in other configurations. Each of the plates 70 also has three carrier holes 75 through which the bolts 12 are used to mount the plates 70 to the bearing carrier 20. Two of the holes 75 and two of the holes 71 are shown in phantom in FIG. 3.

Each of the upper mounting plates 60 also has three carrier holes 61 for mounting to the carrier 20. Two of those holes 61 are shown in FIG. 3 in phantom. Each of the upper plates 60 has two swingarm or link mounting holes 63. One of the holes 63 is shown in use in FIG. 3 for mounting a swingarm or link 16 with a bolt 12.

Figure 4:
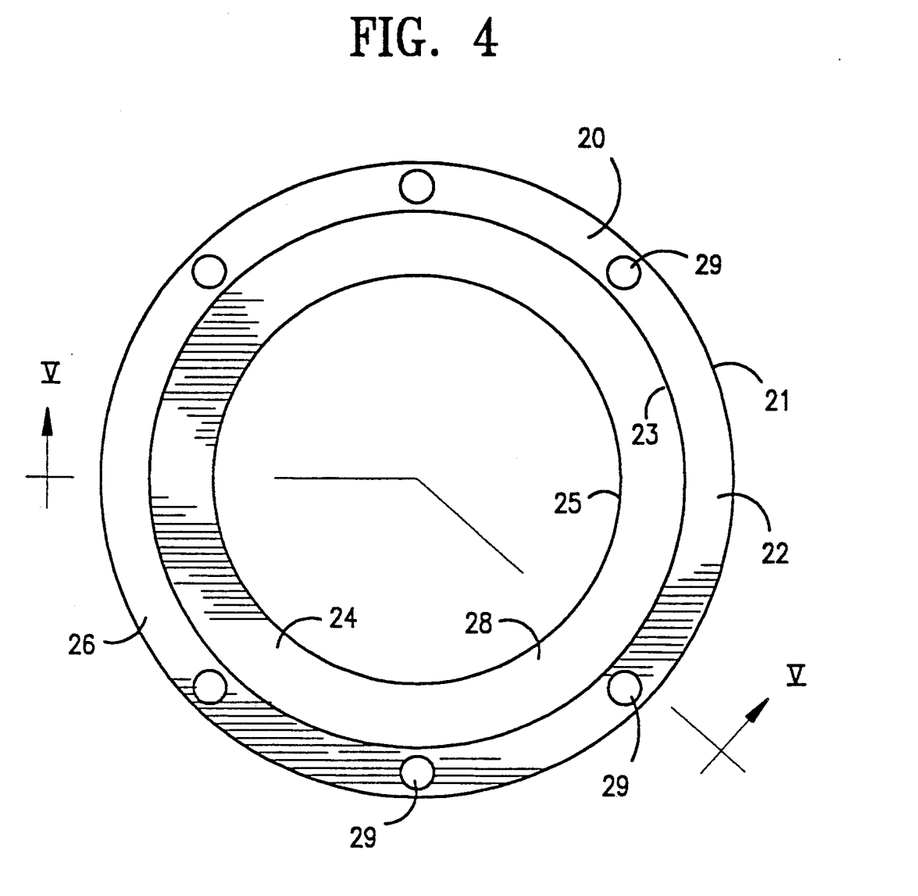
FIG. 4 is a side view of the bearing carrier of the bird cage of FIG. 1.
Figure 5:
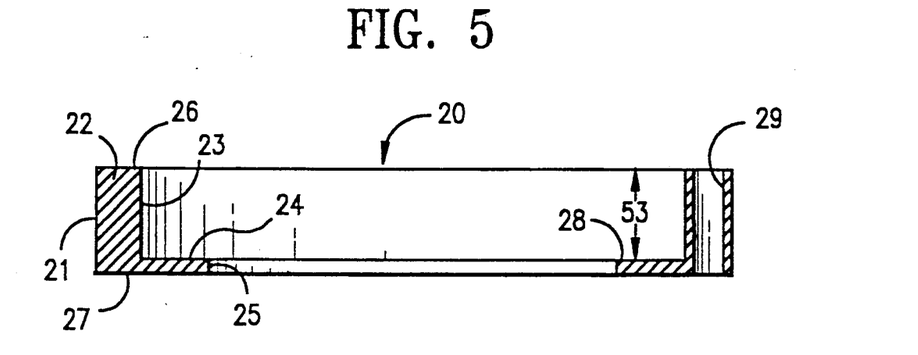
FIG. 5 is a section view taken along line V—V of FIG. 4.

Refer now to FIGS. 4 and 5. The bearing carrier 20 has a cylindrical outer wall portion 22 and an inner flange portion 24 that extends radially inward from the portion 22. The portion 22 has an inner diameter surface 23 that is sized to accept the outer diameter of the outer portion 52 of the roller bearing assembly 50. The flange portion 24 has an inner diameter surface 25 that is sized to extend over the axle casing preferably with some clearance. The depth 53 of the surface 23, between the flange 24 and the surface 26 is sized to be approximately the same as the width 55 (FIG. 15) of the bearing 50.

As shown in FIG. 4, the flange 24 extends around the entire inner circumference of the carrier 20. In addition to adding strength to the carrier 20, one purpose of the flange 24 is to hold the bearing 50 in place axially. To do this, the flange 24 would not have to extend around the entire circumference. Indeed, since the design of the plates 60 and 70 is such that they extend inside the outer diameter of the roller bearing 50, plates 60 and 70, once attached, will hold the bearing 50 and the flange 24 could be eliminated. However, flange 24 is helpful in assembling the bird cage because the roller bearing 50 can be laid in the carrier 20 to rest on a flange 24 for transporting the combination. Thus, by utilizing the flange 24 the roller bearing and carrier may be conveniently handled as a unit without having any plates attached.

Figure 6:
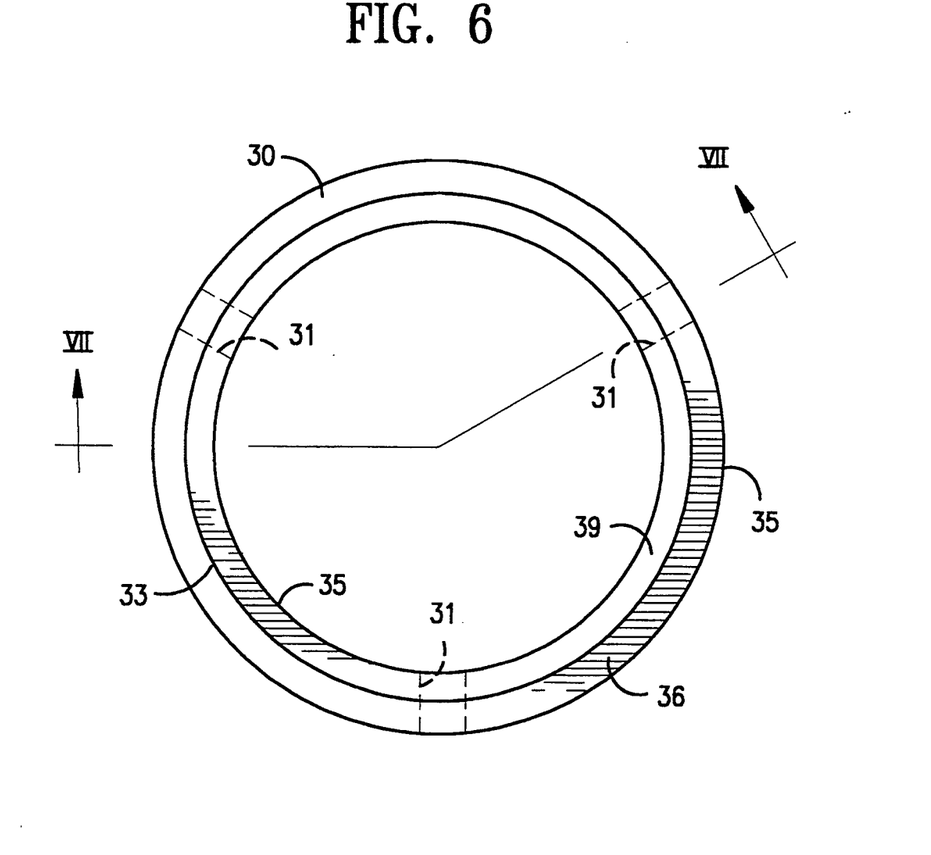
FIG. 6 is a side view of bearing sleeve of the bird cage of FIG. 1.
Figure 7:
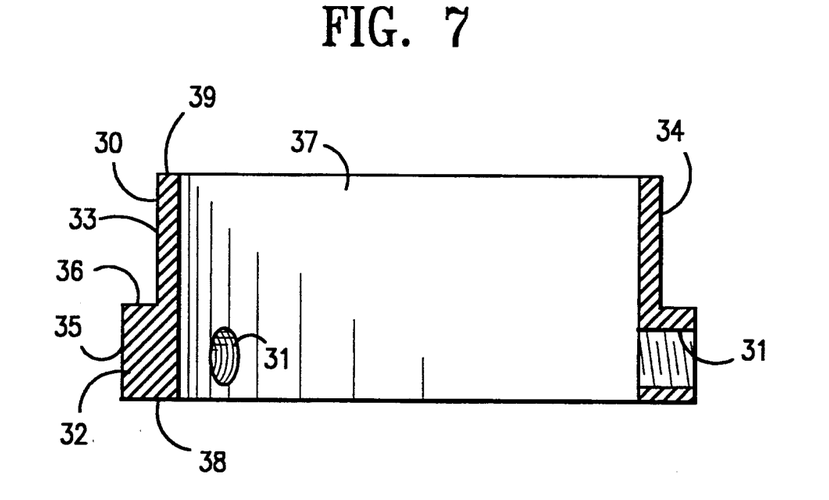
FIG. 7 is a section view taken along line VII—VII of FIG. 6.

Refer now to FIGS. 6 and 7. The bearing sleeve 30 has a cylindrical body portion 32 from which extends axially a flange 34. The bearing sleeve 30 has a common inner diameter surface 37 that extends through both body 32 and flange 34. However, body 32 has a larger outer diameter surface 35 than the outer bearing surface 33 of the flange 34. The surface 33 extends axially a sufficient distance and has an outer diameter size to accommodate the inner portion 54 of the roller bearing 50. The inner diameter surface 35 of the sleeve 30 is sized to fit over the axle casing with a slight clearance sufficient to enable its installation and removal. The bearing sleeve 30 is affixed to the outside of the axle casing 17 with screws 32 extending through threaded holes 31 as described above. The outer diameter shoulder surface 36 of the sleeve 30 is sized to provide axial support to the roller bearing assembly 50 when in position.

Figure 8:
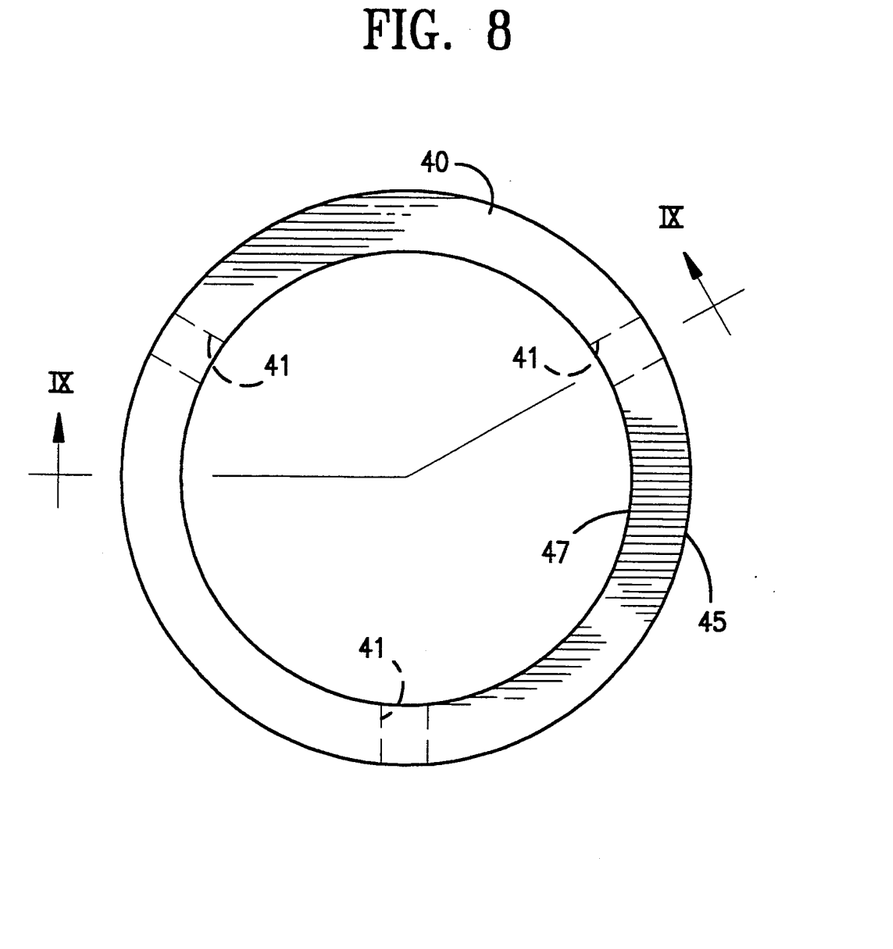
FIG. 8 is an elevation view of the bearing stop of the bird cage of FIG. 1.
Figure 9:
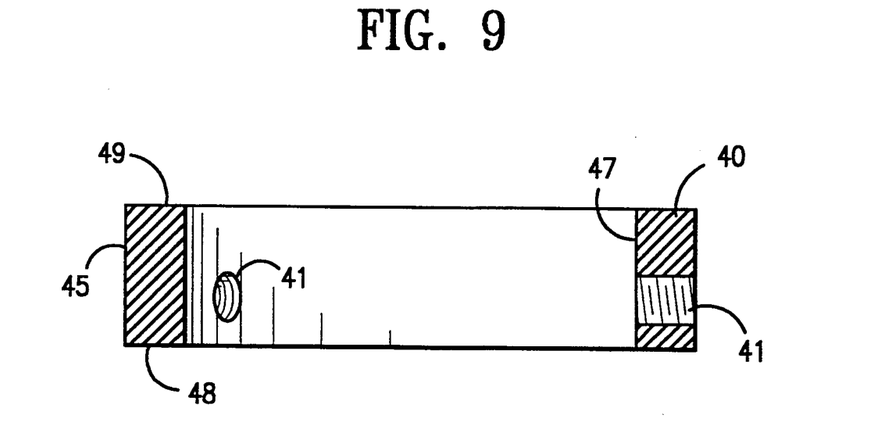
FIG. 9 is a section view taken along line IX—IX of FIG. 8.

Refer now to FIGS. 8 and 9. The bearing stop 40 is a cylindrical sleeve having tapped holes 41 for affixing it to the outside of the axle casing 17 as described above. The inner diameter surface 47 of the bearing stop 40 is sized in the same way as the inner diameter surface 37 of bearing sleeve 30. The outer diameter surface 45 of the bearing stop 40 is sized in the same way as the body portion 33 of the bearing sleeve 30.

Figure 10:
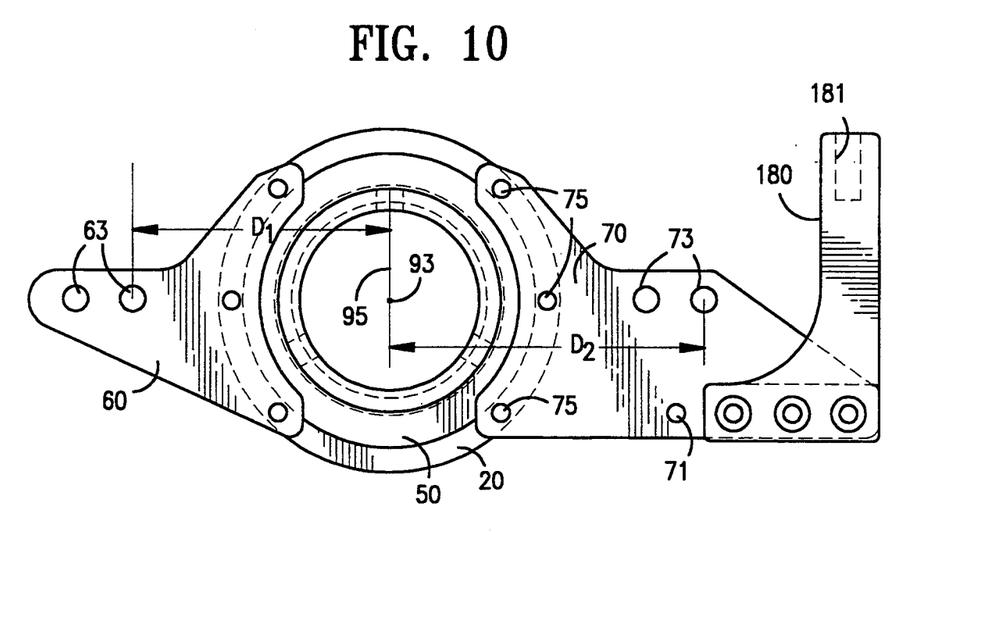
FIG. 10 is a view like FIG. 3 illustrating the use of an alternate front position shock mount.
Figure 11:
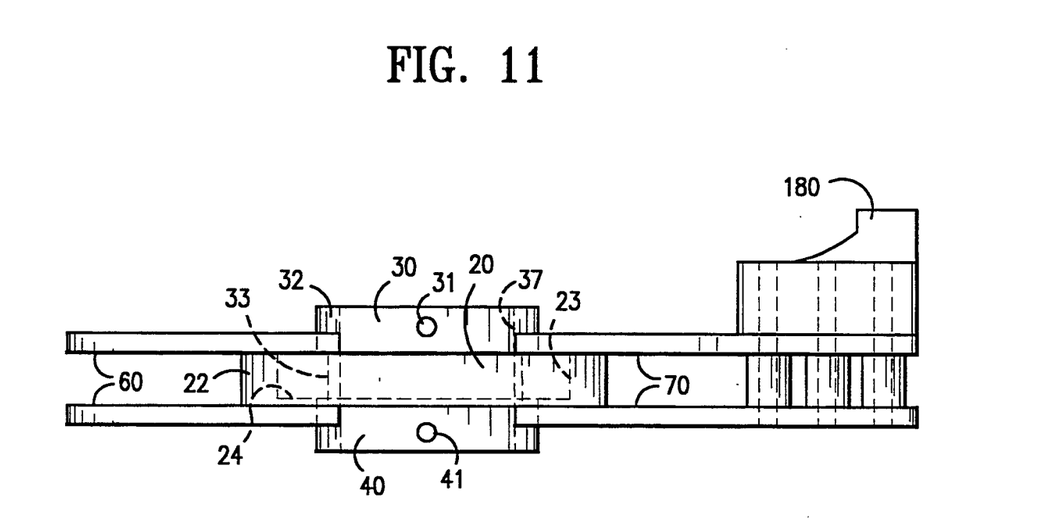
FIG. 11 is a rear view of the bird cage of FIG. 10.

Refer now to FIG. 10, wherein the bird cage of FIG. 1 is shown using shock mounting 180 for a front mounted shock position. As can be seen in FIG. 11 the shock mount 180 is bolted to plate 70 and rises at an angle away from the plane of plate 70. The nuts and bolts are not shown in these and the remainder of the drawing figures. The mount 180 has a threaded aperture 181 to accept the shock absorber bolt as described above with respect to FIG. 2. The distance $D_1$ is the distance between the center of the inner link hole 63 and the symmetry line 95 between the plate holes 75 and 65 and running through the axis 93. The distance $D_2$ is the distance between the outer link hole 73 and the line 95. For many four link suspensions with a front or rear mount shock, $D_1$ is about 4.5 inches and $D_2$ is about 5.5 inches. The distance between the center of the holes 63 and between the center of the holes 73 is about one inch.

Figure 12:
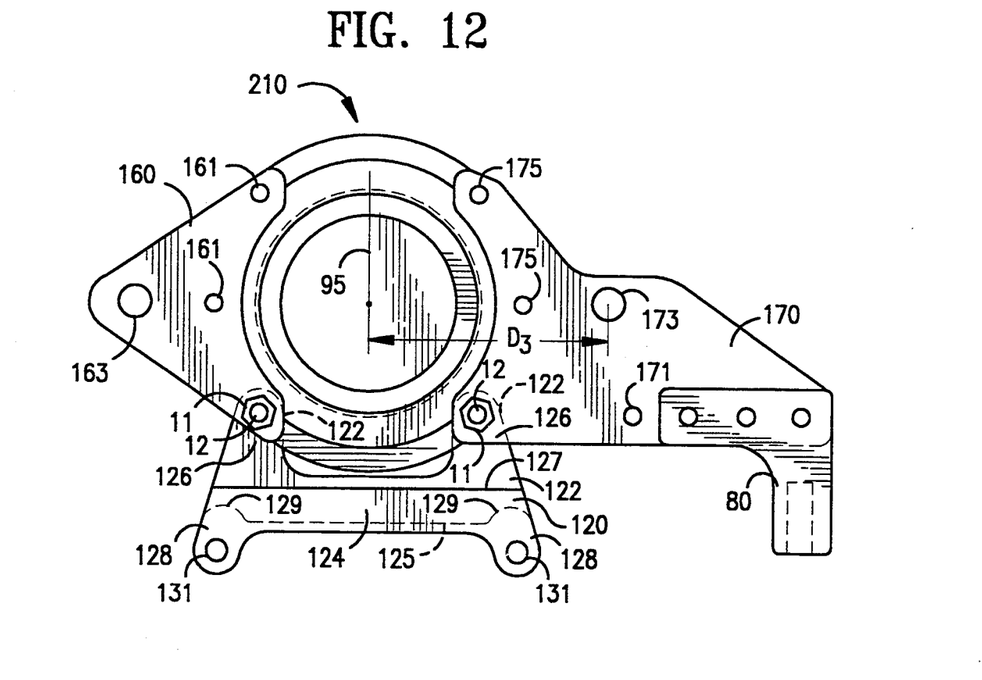
FIG. 12 is a view like FIG. 2 showing an alternate upper and lower mounting plate arrangement.
Figure 13:
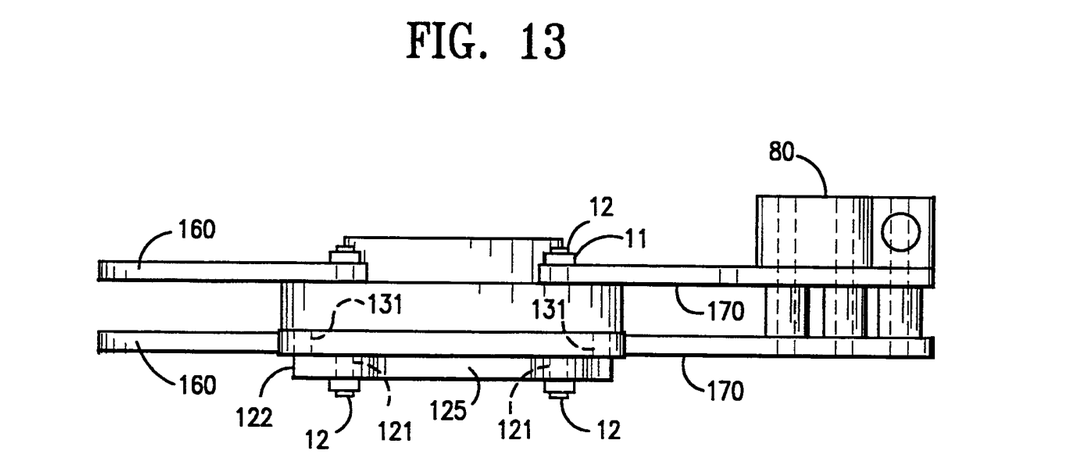
FIG. 13 is a rear view of the bird cage of FIG. 12.

Refer now to FIGS. 12 and 13. Wherein a bird cage arrangement for a four link suspension with a single mounting points is shown. Upper mounting plates 160 are generally triangular in shape and include a single swingarm or link mount hole 163 and, as in all the other plates, three carrier mount holes 161. The lower plate 170 has a single link mount hole 173. $D_3$, the distance between the center of the hole 173 and symmetry line 95 is about $4\frac{1}{2}$ inches.

A caliper bracket 120 is shown bolted by nuts 11 and bolts 12 at carrier holes 121 to an upper mounting plate 160 and a lower mounting plate 170. The caliper bracket 120 is configured for attachment to, with caliper mounting holes 131, and support of a brake caliper assembly (not shown) for a disk brake arrangement. The bracket 120 has a carrier portion 122 with lobes 126 that extend inward to be bolted to the plates 160 and 170. The bracket 120 includes a bracket portion 124 that extends outward of lobes 128 to be bolted to the brake caliper. The bracket 120 is formed in a step configuration, with the caliper portion 124 offset from the carrier portion 122 by the width of step walls 127 and 125. Step wall 125 has two recesses 129 proximate the holes 131 to accomodate a socket or other turning tool for bolting the brake caliper to the bracket 120. The bracket 120 is advantageously mounted towards the rear of the car and on the opposite side of the carrier 20 from the shock mount 80. Other configurations of caliper brackets may be desirable to accomodate the various specific available caliper dimensions and suspension setups.

Figure 14:
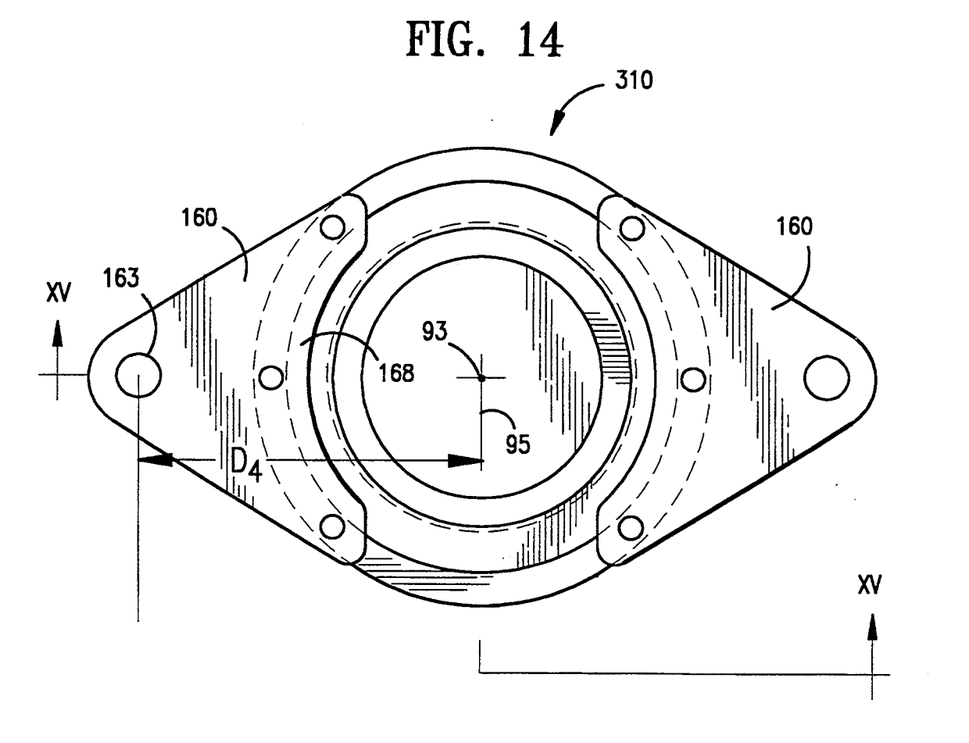
FIG. 14 is a view like FIG. 2 showing another alternate upper and lower mounting plate arrangement.
Figure 15:
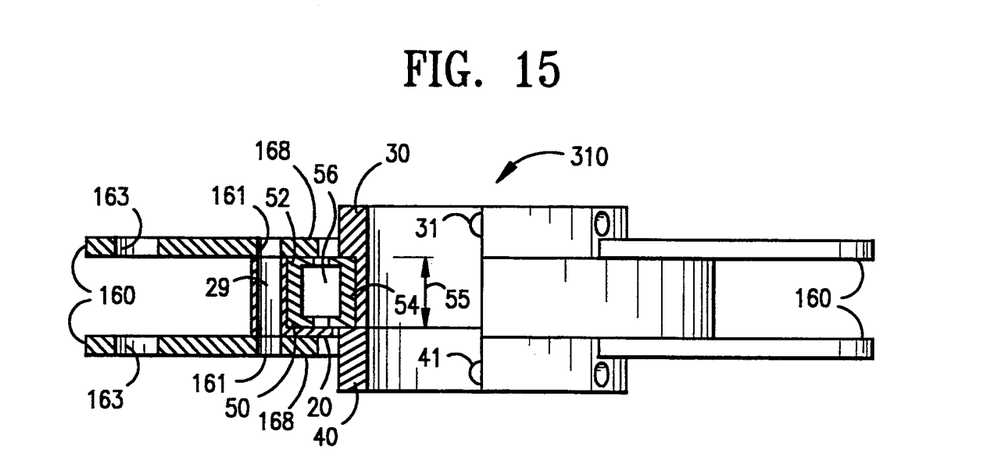
FIG. 15 is a partial section view taken along line XV—XV of FIG. 14.

Refer now to FIGS. 14 and 15. Wherein another alternate bird cage configuration 310 is shown using four identical mounting plates 160. This configuration may be used for so-called "swingarm" and "z-link" suspension setups. $D_4$ is the distance between symmetry line 95 and the center of hole 163. $D_4$ is typically about 4.5 inches. Note in FIG. 15 the schematic representation of the bearing assembly 50. The outer portion 52 rides in carrier 20 and is held by portions 168 of plates 160. The inner portion 54 rides on the sleeve 30 held in place by the stop 40. The rollers 56 provide low friction movement.

The distances $D_1$, $D_2$, $D_3$ and $D_4$ and other dimensions referred to herein are representative and the invention is not limited thereto.

Although preferred embodiments are specifically illustrated and described herein, it will be appreciated that modifications and variations of the present invention are covered by the above teachings and within the purview of the appended claims without departing from the spirit and intended scope of the invention.

What is claimed as new and desired to be protected by letters patent of the United States is:

1. A bird cage for use in mounting an automobile axle assembly of the type having an axle tube to a suspension structure of an automobile comprising:

bearing means for providing low friction rotational movement of the axle tube relative to said bird cage; suspension attachment means for attaching the suspension structure of the automobile to said bearing means; and, axle attachment means for attaching the axle tube to said bearing means.

2. A bird cage for use in mounting an automobile axle assembly of the type having an axle tube to a suspension structure of an automobile comprising:

a bearing sleeve sized to fit around the axle tube and having a bearing receiving portion and a bearing stop portion; a bearing assembly having an inner and an outer portion and sized to fit over said bearing receiving portion; a bearing stop member sized to fit over the axle tube in position to hold said bearing assembly in position on said receiving portion; a bearing carrier sized to fit over said bearing assembly; a plurality of mounting plates bolted to said carrier such that they extend within the outside diameter of said outer portion of said bearing to hold said carrier in position over said bearing assembly, said plates being pivotally mounted to the suspension structure.

3. A bird cage as in claim 1 further comprising:

a bearing sleeve mounted on the axle tube, a sealed roller bearing mounted on said bearing sleeve, and a bearing carrier mounted on an outer diameter of said roller bearing.

4. A bird cage as in claim 3, further comprising: a bearing stop member coupled to said axle tube adjacent to said bearing sleeve, wherein said bearing sleeve includes a bearing receiving portion and a bearing stop portion, said roller bearing being mounted on said receiving portion between said bearing stop portion and said bearing stop member, wherein said bearing sleeve and said bearing stop member are affixed to said automobile axle assembly in such a manner to prevent axial movement relative thereto.

5. A bird cage as in claim 4, wherein said bearing carrier extends entirely around said roller bearing.

6. A bird cage as in claim 3, wherein said suspension attachment means comprises an upper attachment plate and a lower attachment plate coupled to said bearing carrier.

7. A bird cage as in claim 6, wherein said upper attachment plate includes a swingarm mount adapted to be coupled to an upper swingarm of the suspension structure.

8. A bird cage as in claim 7, wherein said upper attachment plate includes a plurality of said swingarm mounts adapted to be coupled to a plurality of configurations of suspension structures.

9. A bird cage as in claim 8, wherein said lower attachment plate includes a lower swingarm mount adapted to be coupled to a lower swing arm of the suspension structure and a shock absorber mount.

10. A bird cage as in claim 9, wherein said lower attachment plate includes a plurality of said swingarm mounts adapted to be coupled to a plurality of configurations of suspension structures.

11. A bird cage as in claim 10, wherein said shock absorber mount is adapted to be switched between a front mount shock absorber coupling and a rear mount shock absorber coupling.

12. A bird cage as in claim 11, further comprising first and second upper mounting plates affixed to opposite sides of said bearing carrier and first and second lower mounting plates affixed to opposite sides of said bearing carrier.

13. A bird cage as in claim 2, wherein said plurality of mounting plates include:
an upper mounting plate having an upper swingarm mount adapted to be pivotally coupled to an upper swingarm of the suspension structure and a lower mounting plate having a lower swingarm mount adapted to be pivotally coupled to a lower swing arm of the suspension structure.

14. A bird cage as in claim 13, wherein said upper mounting plate includes a plurality of said upper swingarm mounts and said lower mounting plate includes a plurality of said lower swingarm mounts, said bird cage thereby being adapted to be coupled to a plurality of configurations of suspension structures.

15. A bird cage as in claim 14, wherein said lower mounting plate includes a shock absorber mount.

16. A bird cage as in claim 15, wherein said shock absorber mount may be switched between a front and rear pivotally mounted shock absorber.

17. A bird cage as in claim 13, further comprising a caliper bracket adapted to support a brake caliper assembly.

18. A bird cage as in claim 17, wherein said caliper bracket is affixed to said upper and lower mounting plates.

19. A bird cage as in claim 13, wherein said upper and lower mounting plates are substantially identical.

20. A bird cage as in claim 13, further comprising first and second upper mounting plates affixed to opposite sides of said bearing carrier and first and second lower mounting plates affixed to opposite sides of said bearing carrier.

* * * * *